June 13, 1967 G. REVESZ ETAL 3,325,744

DIRECT CURRENT AMPLIFIERS

Filed Feb. 15, 1966 3 Sheets-Sheet 1

INVENTORS
George Revesz &
Morton Sklaroff

BY Birch and Birch

ATTORNEYS

INVENTORS
George Revesz &
Morton Sklaroff
BY Birch and Birch
ATTORNEYS

June 13, 1967 G. REVESZ ETAL 3,325,744

DIRECT CURRENT AMPLIFIERS

Filed Feb. 15, 1966 3 Sheets-Sheet 3

INVENTORS
George Revesz &
Morton Sklaroff

BY Harkins M. Birch
ATTORNEY

United States Patent Office 3,325,744

Patented June 13, 1967

3,325,744

DIRECT CURRENT AMPLIFIERS

George Revesz, 420 Bryn Mawr Ave., Bala-Cynwyd, Pa. 19004, and Morton Sklaroff, 7834 Rugby St., Philadelphia, Pa. 19150

Filed Feb. 15, 1966, Ser. No. 540,111
8 Claims. (Cl. 330—8)

This invention relates to direct current amplifiers, and more particularly, to direct current amplifiers incorporating a null balance system therein and is a continuation-in-part of a co-pending application Ser. No. 182,326 filed Mar. 26, 1962, now abandoned.

Direct current amplification has always been, at best, a difficult operation. Previous direct current amplifiers have been critically affected by such things as the individual stability of all of the elements therein, variations in supply voltage and other specific component characteristics.

It is a primary object of this invention to provide a direct current amplifier which is independent of the characteristics of the active elements therein.

Another object of this invention is to provide a direct current amplifier which is unaffected by variations in the supply voltage thereof.

Still another object of this invention is to provide a direct current amplifier wherein the only elements critical to stability of operation are passive elements.

Still another object of this invention is to provide a direct current amplifier comprising a null balance system.

Still another object of this invention is to provide a direct current amplifier comprising a null balance system wherein the system includes an inductance-capacitance bridge circuit as a null detector.

These and other objects of this invention will become further apparent with reference to the following specification and drawings which relate to a preferred embodiment of the invention.

Figure 1:
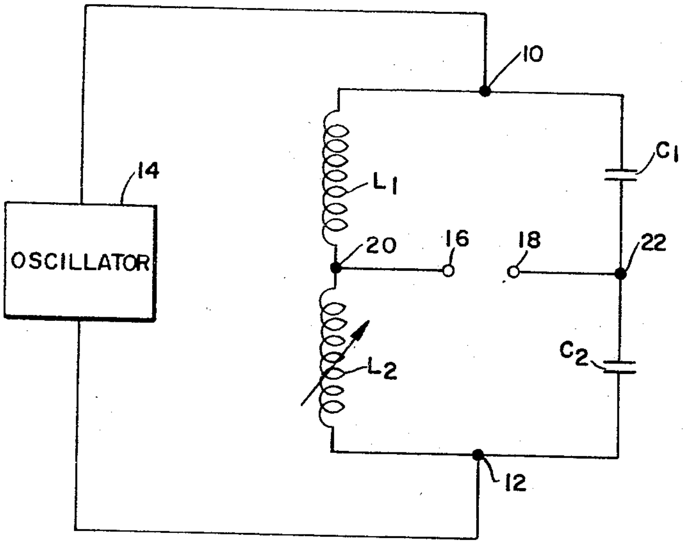
FIGURE 1 is a schematic of the basic inductance-capacitance bridge circuit incorporated in the invention.

Referring in detail to the drawings, and more particularly to FIGURE 1, the basic bridge circuit of the invention is shown as comprising a pair of inductance bridge arms $L_1$ and $L_2$ and a pair of capacitance bridge arms $C_1$ and $C_2$. The two pairs of bridge arms are connected in parallel across the output terminals 10 and 12 of an oscillator power supply 14.

A pair of bridge output terminals 16 and 18 are provided at the junctions 20 and 22 between the two inductors $L_1$ and $L_2$ and the two capacitors $C_1$ and $C_2$, respectively.

The balance equation of the bridge circuit may be expressed as follows with the impedance Z of each bridge arm identified by a corresponding subscript.

$$\frac{Z_{L_1}}{Z_{L_2}}=\frac{Z_{C_1}}{Z_{C_2}}$$

When the above condition exists, the bridge is said to be balanced and no output signal is present across the bridge output terminals 16 and 18, since the magnitude and phase angle of the potential appearing at the intermediate bridge terminals 20 and 22 are identical.

If one of the bridge arms is now made a variable impedance, such as the inductor $L_2$ in FIGURE 1, the bridge may be unbalanced by changing the left hand impedance ratio in the above equation. The output appearing across the bridge output terminals 16 and 18 in response to an unbalanced condition will be a voltage having a phase angle either in phase or out of phase with that of the oscillator power supply 14 depending on the direction of unbalance.

Figure 2:
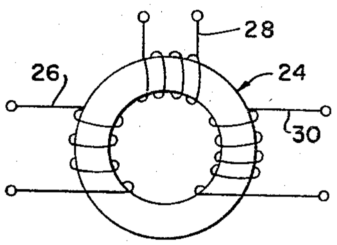
FIGURE 2 is a schematic of a multiple winding saturable core device included in the invention.

Referring now to FIGURE 2, the means for varying the inductances in the bridge arms $L_1$ and $L_2$ is generally shown as comprising a saturable magnetic core 24 having a signal winding 26, a bias winding 28 and a bridge winding 30 thereon. The bridge winding comprises one of the bridge arms $L_1$ and $L_2$.

The bias winding 28 is supplied with direct current from a source not shown to vary the permeability of the core 24 and bias the same to a point within its linear range of variation. If an additional direct current is now introduced into the signal winding 26, the permeability of the core 24 is varied in response to the current in the signal winding 26 and the inductance value of the bridge winding 30 is correspondingly varied. A means is thus provided to vary the impedance of a bridge arm as a function of a direct current input signal.

Figure 3:
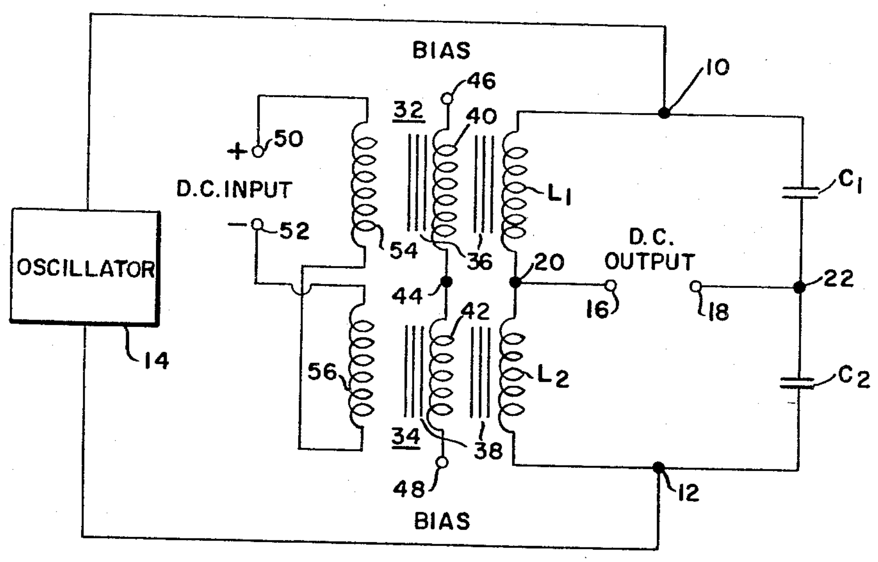
FIGURE 3 is a schematic of the bridge circuit of FIGURE 1 modified by a device such as that shown in FIGURE 2.

Referring now to FIGURE 3, the basic bridge circuit of FIGURE 1 is shown after being combined with saturable core devices 32 and 34 such as that described in conjunction with FIGURE 2.

The saturable core devices 32 and 34 each include individual saturable cores 36 and 38, respectively. Bias windings 40 and 42, respectively, are wound on the saturable cores 36 and 38 in the same winding sense and are connected in series at a terminal 44 across a pair of input terminals 46 and 48 of a direct current power supply, not shown.

The inductor or bridge arm $L_1$ is wound on the core 36 and the inductor or bridge arm $L_2$ is wound on the core 36, both being wound in the same sense.

Connected in series across a common pair of input terminals 50 and 52 but wound in the opposite sense on the saturable cores 36 and 38 are a pair of signal windings 54 and 56, respectively. By winding the two signal windings 54 and 56 in the opposite sense, a small variation in direct current input signal at the input terminals 50 and 52 will cause a substantial unbalanced condition in the bridge circuit since the inductance of one of the bridge arms $L_1$ and $L_2$ will be increased while the inductance of the other will be decreased. Thus, even if the inductors $L_1$ and $L_2$ are identical, an unbalanced condition caused by a change in the impedance ratios of the two arms will be effected.

If the input signal at the input terminals 50 and 52 is of proper polarity such as for example the terminal 50 being positive with respect to the terminal 52, the resulting direct current signal input to the signal windings 54 and 56 will create an unbalance in the bridge circuit such that the output signal across the bridge output terminals 16 and 18 will comprise an alternating current signal in phase with the output of the supply oscillator 14 at the bridge input terminals 10 and 12, thereof.

The basic inductance-capacitance bridge circuit has now been sufficiently modified to generate an output in response to a direct current signal input.

One of the primary problems still remaining is to provide a bridge output which proportionately follows and/or amplifies the direct current signal input.

Figure 4:
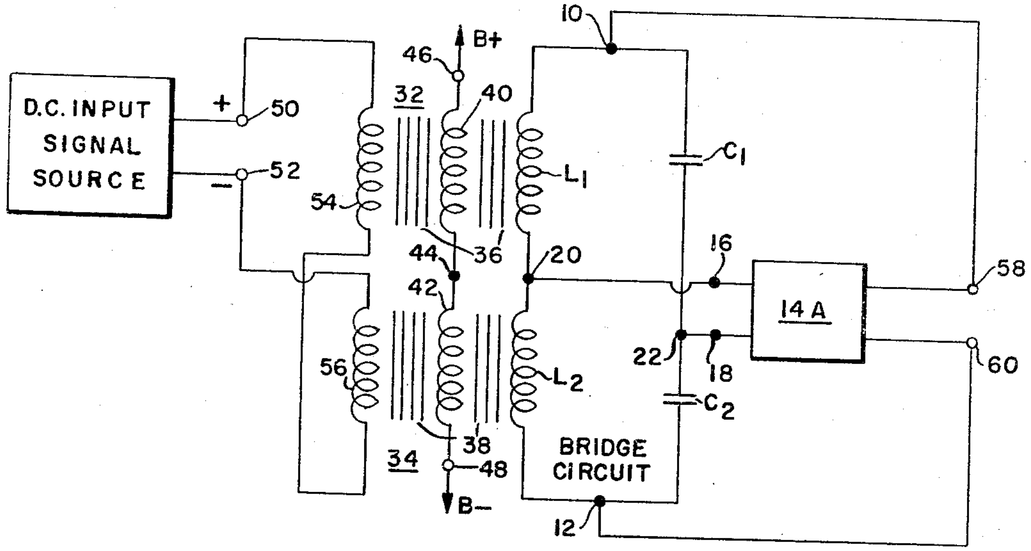
FIGURE 4 is a schematic of a further modification of the bridge circuit of FIGURE 3.

Referring now to FIGURE 4, where the numerals of FIGURE 3 are used to designate like elements, the power supply oscillator 14 is replaced by an amplifier 14A with a positive regenerative feed-back circuit comprising the said bridge circuit. The output terminals 20 and 22 of the bridge circuit are connected with the input terminals 16 and 18, respectively, of the amplifier 14A and the bridge power input terminals 10 and 12 are connected at the output terminals 58 and 60, respectively, of the amplifier 14A. The amplifier 14A includes a conventional source of direct current bias.

Now, if the bridge is unbalanced by the application of a direct current input signal at the signal input terminals 50 and 52 of the signal windings 54 and 56 of the polarity shown, such that an alternating current input at the amplifier input terminals 16 and 18 is in phase with the alternating current output at the output terminals 58 and 60 thereof, the entire bridge circuit will oscillate.

As is well known in the oscillator art, an amplifier connected in a manner such that any output thereof is fed back to the input thereof in phase with the input, through a suitable phase shift network such as an impedance bridge, constitutes a phase-shift oscillator. A classic example of this type of oscillator is the well known Wein bridge oscillator. Such an arrangement, when the bridge parameters are set to relative values effecting the phase shift of the output signal to an in-phase relationship at the amplifier input will oscillate upon normal D.C. energization of the amplifier by its own conventional bias supply. This is a result of such spurious signals inherently present in the amplifier as tube and thermal noise or other transient effects.

The sensitivity of the bridge circuit to small direct current inputs may be adjusted by controlling the magnitude of the direct current in the bias windings 40 and 42, thereby adjusting the inductance values of the inductances $L_1$ and $L_2$, whereby the bridge circuit may be brought to the threshold of oscillation in the absence of any direct current input signals at the signal input terminals 50 and 52. The oscillator circuit comprising the bridge and amplifier 14A will produce an output signal across the amplifier output terminals 58 and 60 of an amplitude proportional to the magnitude of the direct current input signal at the direct current signal input terminals 50 and 52. Thus, the saturable core devices 32 and 34 comprise both tuning and output amplitude control means for the oscillator circuit, the bridge circuit per se comprising the means responsive to the variation in the impedance of the inductances $L_1$ and $L_2$ for tuning the oscillator circuit to the threshold of oscillation.

Figure 5:
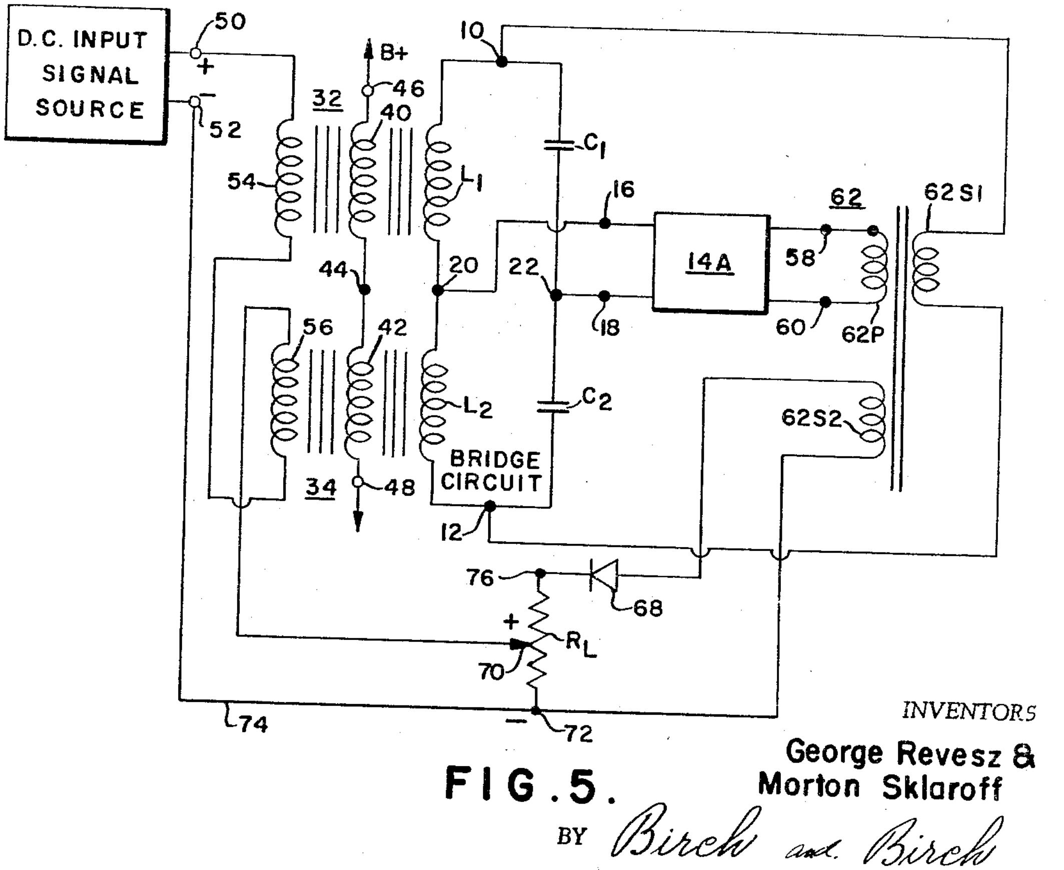
FIGURE 5 is a schematic of a preferred embodiment of the direct current amplifier of the invention.

Referring now to FIGURE 5, the complete direct current amplifier including the oscillator circuit of FIGURE 4 is shown.

By connecting the primary 62P of an output transformer 62 across the amplifier output terminals 58 and 60 and connecting a secondary winding 62S1 across the bridge input terminals 10 and 12, the amplifier 14A has its output connected to its input through a phase shift network comprising the bridge circuit $L_1$, $L_2$, $C_1$ and $C_2$. Thus, assuming oscillation, an alternating current output at the amplifier output terminals 58 and 60 will be fed back through the first secondary winding 62S1 to bridge input terminals 10 and 12, and thence through the bridge circuit and bridge output terminals 20 and 22 to the amplifier input terminals 16 and 18.

A second secondary winding 62S2 is provided on the output transformer 62 and an output load resistance RL is connected thereacross in series with a half-wave rectifier means 68. The load resistance RL includes a variable tap 70 directly connected with the second signal winding 56 of the two oppositely wound signal windings 54 and 56 and further includes an end terminal 72 directly connected through a lead 74 with the second direct current signal input terminal 52 of the direct current amplifier circuit. Thus, a series circuit path is established from the first direct current input terminal 50, through the oppositely wound signal windings 54 and 56, variable tap 70, that portion of the load resistance RL between the variable tap 70 and the end terminal 72, and lead 74 to the second direct current signal input terminal 52.

Since the variable tap 70 located on the load resistance RL between the cathode 76 of the rectifier 68 and the load resistance end terminal 72, the potential appearing at the variable tap 70 is in series opposition to the potential at the first signal input terminal 50. Thus, that portion of the D.C. output voltage across the load resistance RL which is selected by adjustment of the variable tap 70 constitutes a D.C. negative feedback signal with respect to the D.C. input signal at the D.C. input signal terminals 50 and 52 of the direct current amplifier circuit. Accordingly, both the first signal input terminal 50 and the variable tap 70 are shown as being at a positive potential with respect to the second signal input terminal 52 and end terminal 72, respectively, the latter two terminals being commonly connected.

In the operation of the direct current amplifier circuit, the direct current supplied through the terminals 46 and 48 of the bias windings 40 and 42 is adjusted to a magnitude such that the oscillator circuit including the bridge circuit and the amplifier 14A is unbalanced to the point at which it is on the threshold of breaking into oscillation in the absence of any direct current input signals at the signal input terminals 50 and 52. This adjustment also brings the saturable cores 36 and 38 within the operating range of variable permeability which provides a sharp response to a change in magnetic flux in the said cores 36 and 38.

Now, any direct current input signal at the input terminals 50 and 52 of the polarity shown will cause a change in flux in the saturable cores 36 and 38, by virtue of the signal current flowing in the signal windings 54 and 56, that will result in a change in the values of the inductors or bridge arms $L_1$ and $L_2$ which provides sufficient additional unbalance in the bridge circuit to cause it to oscillate (i.e., establish sufficient regenerative feedback in the bridge circuit).

As previously described in conjunction with FIGURE 4, the direction of unbalance in the bridge circuit is predetermined such that the bridge output signal at the terminals 20 and 22 is in phase with the amplifier output signal at the bridge input terminals 10 and 12, whereby a positive feedback is effected at the input terminals 16 and 18 of the amplifier 14A. It is this feedback which produces and sustains oscillation in the oscillator circuit.

The alternating output signal from the second secondary winding 62S2 of the output transformer 62 has an amplitude proportional to the magnitude of the direct current input signal causing the oscillations. This signal is rectified by the half-wave rectifier 68 and a predetermined portion thereof is fed back through variable tap 70 on the load resistance RL into the signal windings 54 and 56 as a negative feedback signal opposing the direct current input signal therein and tending to return the system to a balanced, non-oscillating state. Thus, the direct current output signal between the cathode terminal 76 of the rectifier 68, which also serves as one output terminal of the direct current amplifier circuit, and the end terminal 72 which serves as the other output terminal of the direct current amplifier circuit, is an amplified reflection of the direct current input signal at the signal input terminals 50 and 52 which proportionately follows any variation in that input signal.

Optimum performance of the direct current amplifier circuit of this invention is achieved by the use of magnetic core materials having both low hysteresis characteristics and a high gradient of induction versus magnetomotive force, the latter characteristic comprising the slope of the B/H or hysteresis loop characteristic curve of the core material. This combination of characteristics is very difficult to achieve in most available core materials and thus, a means for compensating this effect is provided in the embodiment of FIGURE 10.

Figure 7:
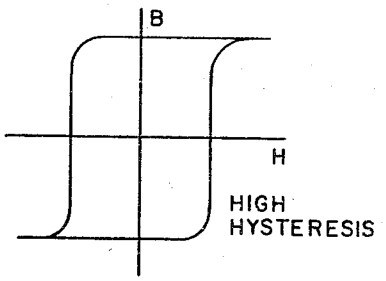
FIGURE 7 is another magnetic hysteresis curve.

In operation of the amplifier circuit of the invention, the signal current in the primary or signal windings 54 and 56 should produce a single valued change in the inductance of the bridge coils $L_1$ and $L_2$. If the hysteresis of the material in the cores 36 and 38 is large, a signal current, in the primary or signal windings 54 and 56, rising to a given value in one direction will produce one set of inductance conditions as indicated by, for example, the left hand side of the B/H curve of FIGURE 7. If this signal current is further increased and subsequently decreased to the same initial value prior to the said further increase, the characteristic inductance condition will now return to the proper signal level through the path of the right hand side of the B/H curve of FIGURE 7, and thus, create an entirely different inductance condition in the bridge arm $L_1$ and $L_2$ for the same value of signal current in the input windings 54 and 56. With this type of hysteresis action of the material in the cores 36 and 38 it would be necessary to drive the cores through the zero axis back to the left hand side of the B/H curve before it would return to the original inductance condition. Thus, true continual proportioning response of the null balance amplifier circuit is precluded by this type of hysteresis response.

Figure 6:
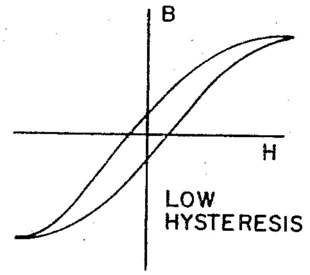
FIGURE 6 is a magnetic hysteresis curve.

A low hysteresis characteristic is portrayed in the B/H curve of FIGURE 6. However, in this case the slope of the curve is too gradual for good amplification even though the rise and return of the curve are much less apt to prevent proportional operation of the system. Thus, the characteristic of the core material of the type defined by FIGURE 7 must be modified to correct the hysteresis error and take advantage of the steep slope of the B/H characteristic curve.

Figure 10:
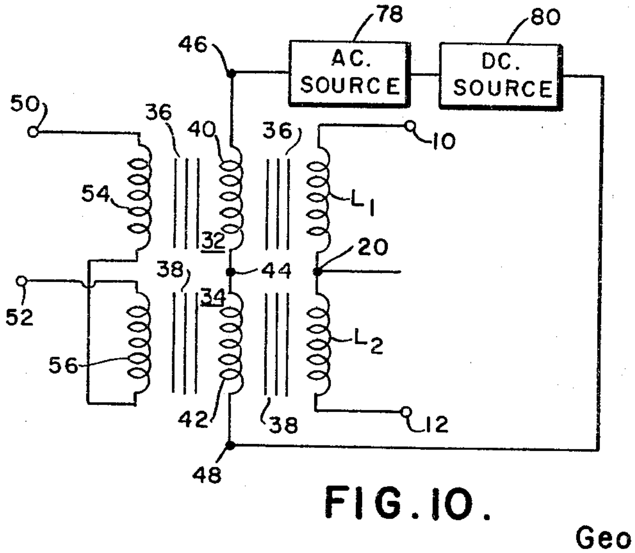
FIGURE 10 is another preferred embodiment of the invention shown as a partial schematic circuit detail to which the curves of FIGURES 6, 7 and 9 are applicable.

Referring now to FIGURE 10, the modification to the embodiments of FIGURES 1, 2, 3, 4 and 5 comprises the addition of an alternating current source 78 in series with a direct current bias supply 80 across the terminals 46 and 48 of the bias windings 40 and 42, respectively. The remainder of the circuit is not shown, the modification being only to the bias portions of the saturable core devices 32 and 34.

In operation, the alternating current source 78 supplies a selected constant amplitude, A.C., bias signal voltage through the bias windings which is superimposed upon the D.C. bias signal from the direct current source 80. The effect of this A.C. bias signal hereinafter referred to as a dither signal is to sweep the cores 36 and 38 with a sinusoidal magnetmotive force (H) about the average D.C. bias level present in the said cores.

Figure 8:
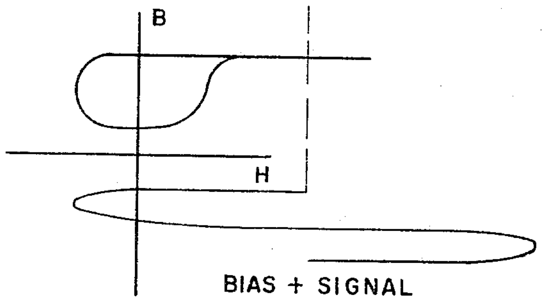
FIGURE 8 is a modified version of FIGURE 7.
Figure 9:
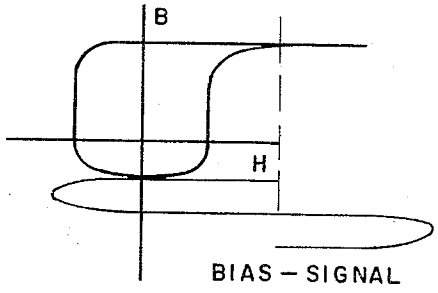
FIGURE 9 is another modified version of FIGURE 7.

Since the signal input windings 54 and 56 are oppositely wound and since, further, as a D.C. input signal effects an increase in the average magnetomotive force (H) in one core and a simultaneous decrease in the other. However, when the A.C. bias dither signal is applied, the results, as shown in FIGURES 8 and 9, are to produce an alternating flux which in one core has a larger dwell time in the saturation region of the B/H curve (FIGURE 8) and in the other core has a larger dwell time in the regions of greater slope of the B/H curve (FIGURE 9).

That core having the larger dwell time in the saturated region will effect a reduced average inductance valve in its associated bridge winding $L_1$ or $L_2$, and the core having the larger dwell time in the region of greater slope will effect an increased average inductance in its associated bridge winding $L_1$ or $L_2$. Since this condition alternates in the respective cores as the dither signal either adds to or subtracts from the D.C. bias level, the cores 36 and 38 will be swept about the average D.C. level and will actually effect an average inductance in each of the bridge windings $L_1$ and $L_2$ in true proportion to the input condition, whereby the effect of hysteresis is effectively eliminated.

Since a null balance or bridge type system is utilized herein and since the threshold of oscillation in response to a direct current input signal may be made highly sensitive, very high gain can be obtained with the resulting large output change in response to minute inputs.

The amplifier circuit of this invention is highly stable and is unaffected by variations in such parameters as the supply voltage or characteristics of the components of the oscillator-amplifier 14 used therein. The only elements having critical stability in the system are the passive elements $L_1$, $L_2$, $C_1$ and $C_2$ of the inductance-capacitance bridge circuit. Passive elements such as these may be produced with a high degree of stability, thus presenting no problem.

As can be seen from the foregoing description, this invention provides a new and novel direct current amplifier with extreme sensitivity and stability and which is unaffected by the stability of individual components therein other than inherently stable passive elements.

It is to be understood that the embodiment shown and described herein is for the purpose of example only and is not intended to limit the scope of the appended claims.

What is claimed is:

1. A direct current amplifier comprising saturable core means having a signal input winding, a bias winding and an output winding; a variable amplitude oscillator circuit comprising a bridge circuit including said output winding as a bridge arm and having input and output terminals, and an amplifier having an input and an output connected at its output to said bridge input terminals and at its input to said bridge output terminals, whereby the response of said circuit to an unbalance therein caused by said variation in the impedance of said output winding appearing at the output of said amplifier will be fed back to the input of said amplifier through said bridge circuit; first means selectively passing a direct current through said bias winding to selectively vary the impedance of said output winding; second means applying a direct current input signal to said input winding on said saturable core means to cause a further variation in the impedance of said output winding; said bridge circuit being responsive to the impedance variation in said output winding tuning said oscillator circuit to the threshold of oscillation and further responsive to said further variation in the impedance of said output winding causing said oscillator circuit to oscillate and produce an alternating current output from said amplifier having an amplitude proportional to the magnitude of said direct current input signal; and rectifier means coupled with the output of said amplifier for converting said alternating current output thereof to a direct current output.

2. The invention defined in claim 1, wherein said saturable core means includes first and second core members, said signal input winding comprises first and second series connected oppositely wound windings, respectively, mounted on said cores, and said bias winding and said output winding each comprise first and second series connected windings wound in the same sense mounted on said first and second core members, respectively, whereby variation of the direct current in said bias winding will vary the impedance in both portions of said output winding in the same direction up to the said threshold of oscillation of said variable amplitude oscillator circuit and whereby variation of the direct current input signal in said signal input winding will vary the impedance in both portions of said output winding in opposite directions to augment the effect of the impedance change at and beyond the said threshold of oscillation.

3. The invention defined in claim 1, wherein said rectifier means includes negative feedback circuit means applying a predetermined portion of said direct current output from said rectifier means to said signal input winding in opposition with said direct current input signal therein.

4. The invention defined in claim 1, wherein said rectifier means includes negative feedback circuit means applying a predetermined portion of said direct current output from said rectifier means to said signal input winding in opposition with said direct current input signal therein; and wherein said saturable core means includes first and second core members, said signal input winding comprises first and second series connected oppositely wound windings, respectively, mounted on said cores, and said bias winding and said output winding each comprise first and second series connected windings wound in the same sense mounted on said first and second core members, respectively, whereby variation of the direct current in said bias winding will vary the impedance in both portions of said output winding in the same direction up to the said threshold of oscillation of said variable amplitude oscillator circuit and whereby variation of the direct current input signal in said signal input winding will vary the impedance in both portions of said output winding in opposite directions to augment the effect of the impedance change at and beyond the said threshold of oscillation.

5. The invention defined in claim 1, wherein said first means further includes bias means superimposing an alternating current bias signal on the direct current in said bias winding.

6. The invention defined in claim 1, wherein said first means further includes bias means superimposing an alternating current bias signal on the direct current in said bias winding; and wherein said saturable core means includes first and second core members, said signal input winding comprises first and second series connected oppositely wound windings, respectively, mounted on said cores, and said bias winding and said output winding each comprise first and second series connected windings wound in the same sense mounted on said first and second core members, respectively, whereby variation of the direct current in said bias winding will vary the impedance in both portions of said output winding in the same direction up to the said threshold of oscillation and whereby variation of the direct current input signal in said signal input winding and the presence of said alternating current bias signal in said bias winding will vary the impedance in both portions of said output winding in opposite directions to augment the effect of the impedance change at and beyond the said threshold of oscillation, said alternating current bias signal acting to sweep said first and second core members with a varying magnetomotive force above and below that average magnetomotive force resulting from the direct current signal level therein to thereby nullify the effect of core hysteresis on the impedance change in said output windings.

7. The invention defined in claim 1, wherein said rectifier means includes negative feedback circuit means applying a predetermined portion of said direct current output from said rectifier means to said signal input winding in opposition with said direct current input signal therein; and wherein said first means further includes bias means superimposing an alternating current bias signal on the direct current in said bias winding.

8. The invention defined in claim 1, wherein said rectifier means includes negative feedback circuit means applying a predetermined portion of said direct current output from said rectifier means to said signal input winding in opposition with said direct current input signal therein; and wherein said first means further includes bias means superimposing an alternating current bias signal on the direct current in said bias winding; and wherein said saturable core means includes first and second core members, said signal input winding comprises first and second series connected oppositely wound windings, respectively, mounted on said cores, and said bias winding and said output winding each comprise first and second series connected windings wound in the same sense mounted on said first and second core members, respectively, whereby variation of the direct current in said bias winding will vary the impedance in both portions of said output winding in the same direction up to the said threshold of oscillation and whereby variation of the direct current input signal in said signal input winding and the presence of said alternating current bias signal in said bias winding will vary the impedance in both portions of said output winding in opposite directions to augment the effect of the impedance change at and beyond the said threshold of oscillation, said alternating current bias signal acting to sweep said first and second core members with a varying magnetomotive force above and below that average magnetomotive force resulting from the direct current signal level therein to thereby nullify the effect of core hysteresis on the impedance change in said output windings.

No references cited.

ROY LAKE, *Primary Examiner.*

NATHAN KAUFMAN, *Assistant Examiner.*